United States Patent
Jo et al.

(10) Patent No.: US 11,904,656 B2
(45) Date of Patent: Feb. 20, 2024

(54) HEAT PUMP SYSTEM CONTROL METHOD FOR VEHICLE

(71) Applicants: HYUNDAI MOTOR COMPANY, Seoul (KR); KIA CORPORATION, Seoul (KR)

(72) Inventors: ChanWoong Jo, Yongin-si (KR); Seong-Bin Jeong, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 163 days.

(21) Appl. No.: 17/724,072

(22) Filed: Apr. 19, 2022

(65) Prior Publication Data

US 2023/0211647 A1  Jul. 6, 2023

(30) Foreign Application Priority Data

Jan. 3, 2022  (KR) .................. 10-2022-0000191

(51) Int. Cl.
*B60H 1/00* (2006.01)
*B60H 1/32* (2006.01)
*B60H 1/14* (2006.01)

(52) U.S. Cl.
CPC ......... *B60H 1/00921* (2013.01); *B60H 1/143* (2013.01); *B60H 1/3213* (2013.01); *B60H 2001/00928* (2013.01)

(58) Field of Classification Search
CPC .. B60H 1/00921; B60H 1/143; B60H 1/3213; B60H 2001/00928; B60H 2001/3257; B60H 1/3222; B60H 2001/3272; B60H 1/3205; B60H 1/3225; B60H 2001/3285; F25B 31/006; B60Y 2200/90
See application file for complete search history.

(56) References Cited

U.S. PATENT DOCUMENTS

2007/0125102 A1\* 6/2007 Concha .................. G01K 13/02
62/149

\* cited by examiner

*Primary Examiner* — Nelson J Nieves
*Assistant Examiner* — Matthew John Moscola
(74) *Attorney, Agent, or Firm* — MCDONNELL BOEHNEN HULBERT & BERGHOFF LLP

(57) ABSTRACT

A heat pump system control method for a vehicle includes a process (A) of operating a compressor of an air conditioner to cool or heat an interior of the vehicle while the vehicle is driving, measuring by a controller initial states of the compressor and a refrigerant based on data detected from a data detector, and monitoring the compressor, a process (B) of determining by the controller whether a current coil temperature of a motor unit provided in the compressor is higher than a coil specification temperature through the process (A) and operating a protection mode; and a process (C) of, when the process (B) is completed, calculating by the controller a slope of a coil temperature of the motor unit over time, determining whether the temperature slope is greater than zero (0) three times consecutively to stop the operation of the compressor, and terminating control.

10 Claims, 3 Drawing Sheets ic # HEAT PUMP SYSTEM CONTROL METHOD FOR VEHICLE

CROSS REFERENCE TO RELATED APPLICATIONS

This application claims priority to and the benefit of Korean Patent Application No. 10-2022-0000191 filed in the Korean Intellectual Property Office on Jan. 3, 2022, the entire contents of which are incorporated herein by reference.

BACKGROUND

(a) Field

The present disclosure relates to a heat pump system control method for a vehicle. More particularly, the present disclosure relates to a heat pump system control method for a vehicle to prevent failure and break in advance in a compressor operated to cool or heat an interior of the vehicle.

(b) Description of the Related Art

Generally, an air conditioning system for a vehicle includes an air conditioner which circulates a refrigerant to heat or cool the interior of the vehicle.

This air conditioner maintains a comfortable interior environment by maintaining an interior temperature of the vehicle at an appropriate temperature regardless of external temperature changes and is configured to heat or cool the interior of the vehicle by heat-exchange by an evaporator while the refrigerant discharged by driving a compressor circulates back to the compressor through a condenser, a receiver dryer, an expansion valve, and the evaporator.

In other words, in a cooling mode, the air conditioner lowers the interior temperature and humidity by condensing high-temperature, high-pressure gaseous refrigerant compressed from the compressor through the condenser and then evaporating it in the evaporator through the receiver dryer and expansion valve.

Recently, as interest in energy efficiency and environmental pollution issues is growing day by day, development of environment-friendly vehicles capable of substantially replacing internal combustion engine vehicles is desired. The environment-friendly vehicles are classified into electric vehicles powered by generally fuel cells or electricity as power sources and hybrid vehicles powered by engines and batteries.

Among these environment-friendly vehicles, no separate heater is used in the electric vehicle or the hybrid vehicle unlike an air conditioning apparatus of a general vehicle, and an air conditioning apparatus applied to the environment-friendly vehicle is generally referred to as a heat pump system.

Here, in the heat pump system applied to the electric vehicle, temperature management is essential to prevent failure and break of the compressor, and conventionally, a temperature is managed through operation control of the compressor.

However, the operation control of the compressor in the heat pump system as described above has a drawback in that a motor unit provided in the compressor is damaged or burned frequently because it is difficult to directly cool the motor unit.

In addition, in the case that the motor unit of the compressor is damaged or burned, there is also a drawback such as increased maintenance cost because the compressor must be repaired or replaced.

Accordingly, there is a need for a control method for directly cooling the motor unit to prevent overheating of the motor unit provided in the compressor.

The above information disclosed in this Background section is only for enhancement of understanding of the background of the disclosure, and therefore it may contain information that does not form the prior art that is already known in this country to a person of ordinary skill in the art.

SUMMARY

Therefore, to solve the above problems, the present disclosure has been made in an effort to provide a heat pump system control method for a vehicle for preventing failure and break of a compressor operated to cool or heat a vehicle interior of an electric vehicle in advance by directly cooling the compressor by controlling a flow rate of a refrigerant or stopping the operation of the compressor according to a temperature of a motor unit provided in the compressor.

To achieve the object, an exemplary embodiment of the present disclosure provides a heat pump system control method for a vehicle including a process (A) of operating a compressor of an air conditioner to cool or heat an interior of the vehicle while the vehicle is driving, measuring by a controller initial states of the compressor and a refrigerant based on data detected from a data detector, and monitoring the compressor, a process (B) of determining by the controller whether a current coil temperature of a motor unit provided in the compressor is higher than a coil specification temperature through the process (A) and operating a protection mode, and a process (C) of, when the process (B) is completed, calculating by the controller a slope of a coil temperature of the motor unit over time, determining whether the temperature slope is greater than zero (0) three times consecutively to stop the operation of the compressor, and terminating control.

The process (A) may include a step of circulating the refrigerant in the air conditioner by driving the compressor according to a user's request for cooling or heating the interior of the vehicle, an initial state measurement step of, by the controller, measuring current and voltage of the motor unit and measuring an initial temperature of the refrigerant, and a step of calculating, by the controller, a resistance of the motor unit using the current and voltage of the motor unit measured in the initial state measurement step and measuring and monitoring the coil temperature of the motor unit.

The process (B) may include a step of determining, by the controller, whether the current coil temperature of the motor unit monitored through the process (A) is higher than the coil specification temperature, and a step of operating the protection mode if it is determined that the current coil temperature of the motor unit is higher than the coil specification temperature (i.e., if a condition is satisfied).

In the step of determining, the controller, whether the current coil temperature of the motor unit is higher than the coil specification temperature, if it is determined that the current coil temperature of the motor unit is lower than the coil specification temperature (i.e., if the condition is not satisfied), the controller may return to the step of monitoring the compressor.

In the step of operating the protection mode, when the vehicle is in a cooling mode or in a cooling and battery cooling mode, the controller may stop operation of a first expansion valve and increase flow rate of the refrigerant inflowing into a chiller by control of a second expansion valve.

In the step of operating the protection mode, when the vehicle is in a heating mode or a heating and dehumidifying mode, the controller may increase flow rate of the refrigerant inflowing into a heat-exchanger by control of a third expansion valve.

The process (C) may include a step of calculating, by the controller, the coil temperature slope of the motor unit over time, a step of determining, by the controller, whether or not the coil temperature slope calculated in the step of calculating the coil temperature slope is greater than zero (0) three times consecutively, and a step of stopping the operation of the compressor and terminating the control if it is determined that the coil temperature slope is greater than zero (0) three times consecutively (i.e., if a condition is satisfied) in the step of determining whether or not the coil temperature slope is greater than zero (0) three times consecutively.

If it is determined that the coil temperature slope is not greater than zero (0) three times consecutively in the step of determining whether or not the coil temperature slope is greater than zero (0) three times consecutively (i.e., if the condition is not satisfied), the controller may return to the step of monitoring the compressor.

In the step of monitoring, the coil temperature of the motor unit may be determined by the following equation, $$T = \left(\frac{R - R_0}{R_0}\right) \times (K + T_0) + T_0,$$

where T is a temperature of a winding, $T_0$ is an initial temperature of the winding, R is a winding resistance at the temperature T, $R_0$ is the winding resistance at the temperature $T_0$, and K is a temperature coefficient of the winding.

The data detector may include an air conditioning switch configured to turn ON and OFF operation of the air conditioner, a refrigerant temperature sensor configured to measure a temperature of the refrigerant, a current sensor configured to measure current of the motor unit, and a voltage sensor configured to measure voltage of the motor unit.

As described above, according to a heat pump system control method for a vehicle according to an exemplary embodiment of the present disclosure, it is possible to prevent failure and break of a compressor operated to cool or heat a vehicle interior of an electric vehicle in advance by directly cooling the compressor by controlling a flow rate of a refrigerant or stopping the operation of the compressor according to a temperature of a motor unit provided in the compressor.

Further, according to an embodiment of the present disclosure, it is possible to prevent an increase in manufacturing cost by calculating a coil temperature of the motor unit by resistance method calculation using current and voltage measurement so that the temperature of the motor unit can be measured without adding a separate temperature sensor.

Further, according to an embodiment of the present disclosure, it is possible to prevent damage and burning of the motor unit due to poor cooling in advance by increasing the flow rate of the refrigerant inflowing into the compressor according to the temperature of the motor unit to directly cool the motor unit.

Furthermore, according to an embodiment of the present disclosure, it is possible to improve durability and lifespan of the compressor, and reduce maintenance cost.

DETAILED DESCRIPTION

Figure 1:
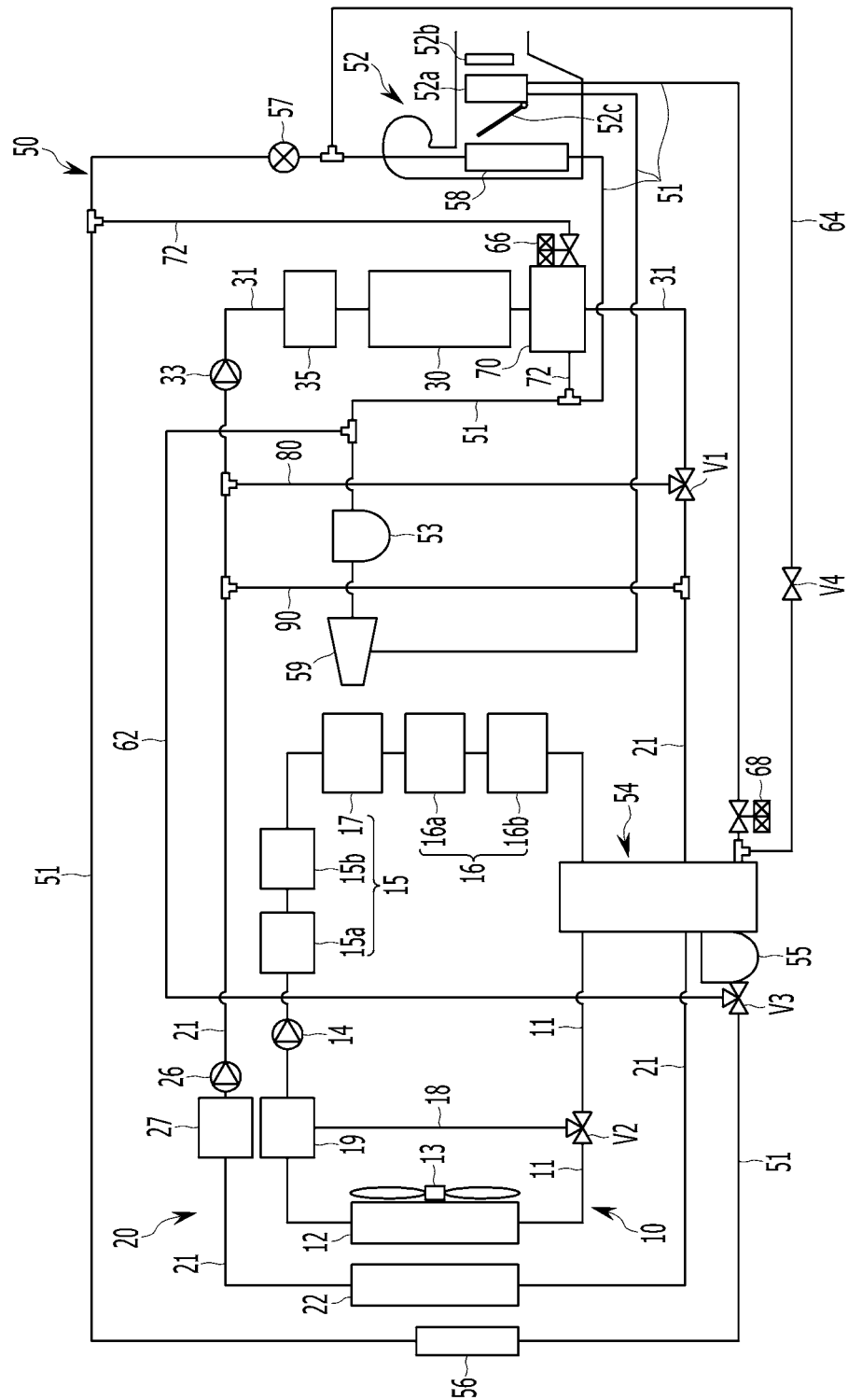
FIG. 1 is a block diagram of a heat pump system for a vehicle according to an exemplary embodiment of the present disclosure.

An exemplary embodiment of the present disclosure will hereinafter be described in detail with reference to the accompanying drawings.

Prior to the description, it should be understood that exemplary embodiments described in the specification and configurations shown in the drawings are merely the most preferred exemplary embodiments of the present disclosure and that, since they do not represent all of the technical ideas of the present disclosure, there may be various equivalents and modifications that can be substituted for them at the time of filing the present application.

In addition, unless explicitly described to the contrary, the word "comprise", and variations such as "comprises" or "comprising", will be understood to imply the inclusion of stated elements but not the exclusion of any other elements, throughout the specification.

Further, terms such as " . . . unit", " . . . means", " . . . part", and " . . . member" described in the specification refer to a unit of a comprehensive configuration which performs at least one function or operation.

FIG. 1 is a block diagram of a heat pump system for a vehicle according to an exemplary embodiment of the present disclosure.

A heat pump system for a vehicle according to an exemplary embodiment of the present disclosure may regulate a temperature of a battery module 30 by using a single chiller 70 in which a refrigerant and a coolant are heat-exchanged, and improve heating efficiency by using waste heat of an electrical component 15 and a motor 16, and the battery module 30.

Here, in the heat pump system for an electric vehicle, a first cooling apparatus 10 for cooling the electrical component 15 and the motor 16, a second cooling apparatus 20 for cooling the battery module 30, and an air conditioner 50 which is an air conditioning apparatus for cooling or heating an interior may be interlocked.

In other words, referring to FIG. 1, the heat pump system includes the first and second cooling apparatus 10 and 20, the battery module 30, and the chiller 70.

First, the first cooling apparatus 10 includes a first radiator 12 and a first water pump 14 connected to a first coolant line 11.

The first cooling apparatus 10 circulates a coolant in the first coolant line 11 through operation of the first water pump 14 to cool at least one electrical component 15 and at least one motor 16.

The first radiator 12 is disposed in the front of the vehicle, and a cooling fan 13 is provided at the rear of the first radiator 12, to cool the coolant through operation of the cooling fan 13 and heat-exchange with outside air.

Here, the electrical component 15 may include a power control apparatus, or an inverter, or a charger (On Board Charger (OBC)) 17. The power control apparatus or the inverter may generate heat while driving, and the charger 17 may generate heat when charging the battery module 30.

In addition, the inverter may include first and second inverters 15a and 15b provided in the first coolant line 11, which correspond to front and rear wheels of the vehicle.

Further, the motor 16 may include first and second motors 16a and 16b provided in the first coolant line 11, which correspond to the front and rear wheels of the vehicle.

The electrical component 15 and the motor 16 configured as above may be disposed in series in the first coolant line 11.

Further, a first reservoir tank 19 is provided in the first coolant line 11 between the first radiator 12 and the first water pump 14. The coolant cooled in the first radiator 12 may be stored in the first reservoir tank 19.

The first cooling apparatus 10 configured as above circulates the coolant cooled in the first radiator 12 through the operation of the first water pump 14 along the first coolant line 11 to cool the electrical component 15 and the motor 16 so as not to overheat.

In the present exemplary embodiment, the second cooling apparatus 20 includes a second radiator 22 and a second water pump 26 connected to a second coolant line 21, and circulates a coolant in the second coolant line 21.

The second cooling apparatus 20 may selectively supply the coolant cooled by the second radiator 22 to the battery module 30.

The second radiator 22 is disposed in front of the first radiator 12, and cools the coolant through the operation of the cooling fan 13 and heat-exchange with the outside air.

In addition, a second reservoir tank 27 is provided in the second coolant line 21 between the second radiator 22 and the second water pump 26. The coolant cooled by the second radiator 22 may be stored in the second reservoir tank 27.

The second cooling apparatus 20 configured as above may circulate the coolant cooled in the second radiator 22 along the second coolant line 21 through operation of the second water pump 26.

In the present exemplary embodiment, the configuration in which the second radiator 22 is provided in the second cooling apparatus 20 as an exemplary embodiment, but the present disclosure is not limited thereto. The second cooling apparatus 20 may be connected to the first radiator 12 instead of the second radiator 22.

In other words, in the case that there is not the second radiator 22 in the second cooling apparatus 20, the second coolant line 21 may be connected to the first radiator 12 so that the coolant is supplied from the first radiator 12.

In the present exemplary embodiment, the battery module 30 is provided in a battery coolant line 31 selectively connected to the second coolant line 21 through a first valve V1.

Here, the first valve V1 may selectively connect the second coolant line 21 and the battery coolant line 31 between the second radiator 22 and the battery module 30.

More particularly, the first valve V1 may selectively connect the second coolant line 21 and the battery coolant line 31 between the chiller 70 provided in the battery coolant line 31 and the second radiator 22.

Here, the battery module 30 supplies power to the electrical component 15 and the motor 16, and is formed as a water cooled type which is cooled by the coolant flowing along the battery coolant line 31.

In other words, the battery module 30 is selectively connected to the second cooling apparatus 20 through the battery coolant line 31 according to operation of the first valve V1. Further, the coolant may be circulated in the battery module 30 through operation of a third water pump 33 provided in the battery coolant line 31.

The third water pump 33 operates to circulate the coolant through the battery coolant line 31.

Here, the first, second, and third water pumps 14, 26, and 33 may be electric water pumps.

On the other hand, the first cooling apparatus 10 may be provided with a first branch line 18 connected to the first coolant line 11 between the first radiator 12 and the first water pump 14 through a second valve V2 provided in the first coolant line 11 between the first radiator 12 and the first water pump 14.

More specifically, the second valve V2 is provided in the first coolant line 11 between the electrical component 15 and the motor 16 and the first radiator 12.

One end of the first branch line 18 is connected to the first coolant line 11 through the second valve V2. The other end of the first branch line 18 may be connected to the first reservoir tank 19 between the first radiator 12 and the first water pump 14.

The first branch line 18 is selectively opened through operation of the second valve V2 in the case of increasing the temperature of the coolant by absorbing the waste heat generated by the electrical component 15 and the motor 16.

At this time, the first coolant line 11 connected to the first radiator 12 is closed through the operation of the second valve V2.

In the present exemplary embodiment, the chiller 70 is provided in the battery cooling water line 31 so that the coolant passes therein, and is connected to a refrigerant line 51 of the air conditioner 50 through a refrigerant connection line 72.

The chiller 70 may control the temperature of the coolant by heat-exchanging the coolant selectively inflowing therein with the refrigerant supplied from the air conditioner 50. Here, the chiller 70 may be a water-cooled heat-exchanger into which the coolant inflows.

In addition, a coolant heater 35 may be provided in the battery coolant line 31 between the battery module 30 and the third water pump 33.

The coolant heater 35 is turned ON when the temperature of the battery module 30 is required to increase and heats the coolant circulated in the battery coolant line 31 to allow the coolant whose temperature has risen to inflow to the battery module 30.

The coolant heater 35 may be an electric heater which operates according to power supply.

Further, the battery coolant line 31 is provided with a second branch line 80 connecting each battery coolant line 31 between the chiller 70 and the battery module 30 through the first valve V1.

In other words, the second branch line 80 may selectively separate the second coolant line 21 and the battery coolant line 31 according to the operation of the first valve V1 so that the battery coolant line 31 forms a close and seal circuit independent of the second cooling apparatus 20.

A third branch line 90 separating the battery coolant line 31 and the second coolant line 21 is provided in the second coolant line 21.

The third branch line 90 may be selectively connected to the second coolant line 21 so that the second cooling apparatus 20 forms an independent close and seal circuit through the second coolant line 21.

Meanwhile, a separate valve may be provided at a point where the third branch line 90 intersects with the second coolant line 21 and the battery coolant line 31 or on the third branch line 90. The valve may be a 3-Way or 2-Way valve.

Accordingly, the first valve V1 selectively connects the second coolant line 21 and the battery coolant line 35 or selectively connects the battery coolant line 31 and the second branch line 80, to control flow of the coolant.

In other words, in the case of cooling the battery module 30 using the coolant cooled in the second radiator 22, the first valve V1 may connect the second coolant line 21 connected to the second radiator 21 and the battery coolant line 31, and may close the second branch line 80.

Then, the coolant cooled in the second radiator 22 may cool the battery module 30 while flowing along the second coolant line 11 and the battery coolant line 31 connected through the operation of the first valve V1.

Further, in the case of cooling the battery module 30 using the coolant heat-exchanged with the refrigerant, the first valve V1 may open the second branch line 80 and close the connection of the second coolant line 21 and the first valve V1.

Accordingly, the low-temperature coolant that has completed heat-exchange with the refrigerant in the chiller 70 inflows into the battery module 30 through the second branch line 80 opened by the first valve V1, so that the battery module 30 may be cooled efficiently.

On the other hand, in the case of increasing the temperature of the battery module 30, the coolant circulating along the battery coolant line 31 is prevented from inflowing into the second radiator 22 through the operation of the first valve V1, thereby allowing the coolant heated through the operation of the coolant heater 35 to inflow into the battery module 30 to rapidly increase the temperature of the battery module 30.

In the present exemplary embodiment, the configuration in which no valve is provided in the third branch line 90 is described as an exemplary embodiment, but the present disclosure is not limited thereto. For selective opening of the third branch line 90, it is possible to apply a valve as needed.

In other words, it is possible to control the flow rate of the coolant circulating in the third branch line 90 through the second coolant line 21, the battery coolant line 31, and the second branch line selectively connected according to each mode of the vehicle (heating, cooling, dehumidifying), and the operation of the second and third water pumps 26 and 33, so that the third branch line 90 may be controlled to open and close.

On the other hand, in the present exemplary embodiment, the air conditioner 50 include an HVAC module (Heating, Ventilation, and Air Conditioning) 52, a heat-exchanger 54, a receiver dryer 55, a first expansion valve 57, an evaporator 58, and a compressor 59 connected through the refrigerant line 51.

First, the HVAC module 52 is connected through the refrigerant line 51, and an opening/closing door 52c for controlling the outside air passing through the evaporator 58 to inflow selectively into an internal condenser 52a and an internal heater 52b according to the cooling mode, heating mode, and heating and dehumidifying mode of the vehicle is provided in the HVAC module 52.

In other words, in the heating mode of the vehicle, the opening/closing door 52c is opened so that the outside air passing through the evaporator 58 inflows into the internal condenser 52a and the internal heater 52b. Conversely, in the cooling mode of the vehicle, the opening/closing door 52c closes the internal condenser 52a and the internal heater 52b so that the outside air cooled while passing through the evaporator 58 directly inflows into the vehicle interior.

The heat-exchanger 54 is connected to the refrigerant line 51 so that the refrigerant passes therethrough, and is connected to the first and second coolant lines 11 and 21 so that the coolants circulating in the first and second cooling apparatuses 10 and 20 pass therethrough, respectively.

The heat-exchanger 54 may condense or evaporate the refrigerant through heat-exchange with the coolant supplied through the first and second coolant lines 11 and 21 according to the mode of the vehicle.

In other words, the refrigerant passing through the heat-exchanger 54 may be selectively condensed or evaporated according to the cooling mode or heating mode of the vehicle through mutual heat-exchange with the coolant supplied from any one of the first coolant line 11 and the second coolant line 21, or with the coolants supplied from the first and second coolant lines 11 and 21, respectively.

The heat-exchanger 54 may be a water-cooled heat-exchanger into which the coolant inflows.

Each of the coolants having different temperatures circulating in the first cooling apparatus 10 and the second cooling apparatus 20, respectively, flows in the heat-exchanger 54 configured as above, and at this time, the refrigerant inflowing into the heat-exchanger 54 may be heat-exchanged with each of the coolants having the different temperatures.

In the present exemplary embodiment, the receiver drier 55 may separate a gas refrigerant and a liquid refrigerant from the refrigerants for which heat-exchange is completed in the heat-exchanger 54 and selectively exhaust them. The receiver dryer 55 may be integrally mounted to the heat-exchanger 54.

Meanwhile, the refrigerant line 51 between the heat-exchanger 54 and the evaporator 58 may be provided with a sub-condenser 56 for additionally condensing the refrigerant that has passed through the heat-exchanger 54.

The sub-condenser 56 is disposed in front of the second radiator 22 to perform mutual heat-exchange of the refrigerant inflowing therein with the outside air.

As such, when the heat-exchanger 54 condenses the refrigerant, the sub-condenser 56 may further condense the refrigerant condensed in the heat-exchanger 54, thereby increasing sub cool of the refrigerant and thus improving Coefficient Of Performance (COP), which is a coefficient of cooling capacity compared to power consumed by the compressor.

In the present exemplary embodiment, the first expansion valve 57 is provided in the refrigerant line 51 connecting the sub-condenser 56 and the evaporator 58. The first expansion valve 57 is supplied with the refrigerant passing through the sub-condenser 56 and expands it. The first expansion valve 57 may be a mechanical expansion valve.

The compressor 59 is connected between the evaporator 58 and the heat-exchanger 54 through the refrigerant line 51. The compressor 59 may compress a gaseous refrigerant and supply the compressed refrigerant to the internal condenser 52a.

The air conditioner 50 configured as above may further include a first bypass line 62, a second bypass line 64, a second expansion valve 66, and a third expansion valve 68.

First, the second expansion valve 66 is provided in the refrigerant connection line 72 between the sub-condenser 56 and the chiller 70.

Here, the second expansion valve 66 is operated when the battery module 30 is cooled with the refrigerant in the cooling mode of the vehicle. The second expansion valve 66 may expand the refrigerant inflowing therein through the refrigerant connection line 72 and allow it to inflow into the chiller 70.

In other words, the second expansion valve 66 may expand the condensed refrigerant exhausted from the sub-condenser 56 and allow it to inflow into the chiller 70 in a state in which the temperature of the refrigerant is lowered, thereby further lowering the water temperature of the coolant passing through the inside of the chiller 70.

Accordingly, the coolant whose water temperature is lowered while passing through the chiller 70 inflows into the battery module 30, so that the battery module 30 may be cooled more efficiently.

In the present exemplary embodiment, the first bypass line 62 may connect the refrigerant line 51 and the compressor 59 between the heat-exchanger 54 and the first expansion valve 57 so that the gas refrigerant passing through the receiver dryer 55 selectively inflows into the compressor 59.

Here, one end of the first bypass line 62 is connected to the refrigerant line 21 through a third valve V3 provided in the refrigerant line 51.

The other end of the first bypass line 62 may be connected to the refrigerant line 51 between the evaporator 58 and the compressor 59.

The third valve V3 may selectively open the first bypass line 62 according to the mode of the vehicle.

Accordingly, the first bypass line 62 opened through operation of the third valve V3 may supply the gas refrigerant which has passed through the receiver dryer 55 to the compressor 59 in the heating mode of the vehicle.

Further, the receiver dryer 55 may supply the liquid refrigerant to the sub-condenser 56 through the refrigerant line 51 opened through the operation of the third valve V3.

In other words, the receiver dryer 55 may supply the gas refrigerant to an accumulator 53 through the first bypass line 62 which is selectively opened through the operation of the third valve V3.

Further, the receiver dryer 55 may supply the liquid refrigerant to the refrigerant line 51 which is selectively opened through the operation of the third valve V3.

Here, the accumulator 53 may be disposed in the refrigerant line 51 between the compressor 59 and the evaporator 58.

The accumulator 53 is selectively supplied with the refrigerant exhausted from the receiver dryer 55 through the operation of the third valve V3 which operates according to the mode of the vehicle.

In other words, the accumulator 53 supplies only the gaseous refrigerant to the compressor 59, thereby improving efficiency and durability of the compressor 59.

In the present exemplary embodiment, the third expansion valve 68 may be provided in the refrigerant line 51 between the internal condenser 52a and the heat-exchanger 54.

The third expansion valve 68 may selectively expand the refrigerant inflowing into the heat-exchanger 54 and the second bypass line 64 in the heating and dehumidifying mode of the vehicle.

Here, the second and third expansion valves 66 and 68 may be electronic expansion valves which selectively expand the refrigerant while controlling the flow of the refrigerant.

Meanwhile, when that the third expansion valve 68 expands the refrigerant, the heat-exchanger 54 may evaporate the refrigerant through heat-exchange with the coolant, and when the third expansion valve 68 does not expand the refrigerant, the heat-exchanger 54 may condense the refrigerant through heat-exchange with the coolant.

Further, the second bypass line 64 may connect the refrigerant line 51 between the heat-exchanger 54 and the third expansion valve 68 and the refrigerant line 51 between the first expansion valve 57 and the evaporator 58 so that a portion of the refrigerant which has passed through the internal condenser 52a selectively inflows into the evaporator 58.

Here, a fourth valve V4 may be provided in the second bypass line 64. The fourth valve V4 may selectively open the second bypass line 64 in the dehumidifying mode of the modes of the vehicle.

Accordingly, the second bypass line 64 may allow a portion of the refrigerant expanded through operation of the third expansion valve 68 to inflow into the evaporator 58 in the heating and dehumidifying mode of the vehicle, thereby performing interior dehumidification without operation of the first expansion valve 57.

In the heat pump system configured as described above, the second expansion valve 66 and the third expansion valve 68 may be electronic expansion valves which selectively expand the refrigerant while controlling the flow of the refrigerant.

In addition, the first, second, and third valves V1, V2, and V3 may be 3-way valves capable of distributing flow rate, and the fourth valve V4 may be 2-way valve.

Hereinafter, a control method of the heat pump system for the vehicle configured as described above will be described referring to FIGS. 2 and 3 attached hereto.

Figure 2:
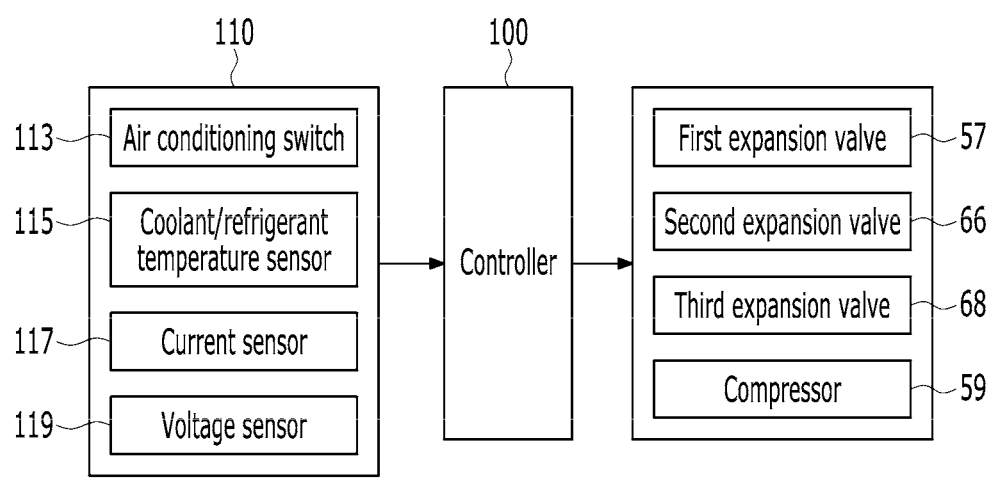
FIG. 2 is a block diagram illustrating a heat pump system control apparatus to which a heat pump system control method for a vehicle according to an exemplary embodiment of the present disclosure is applied.
Figure 3:
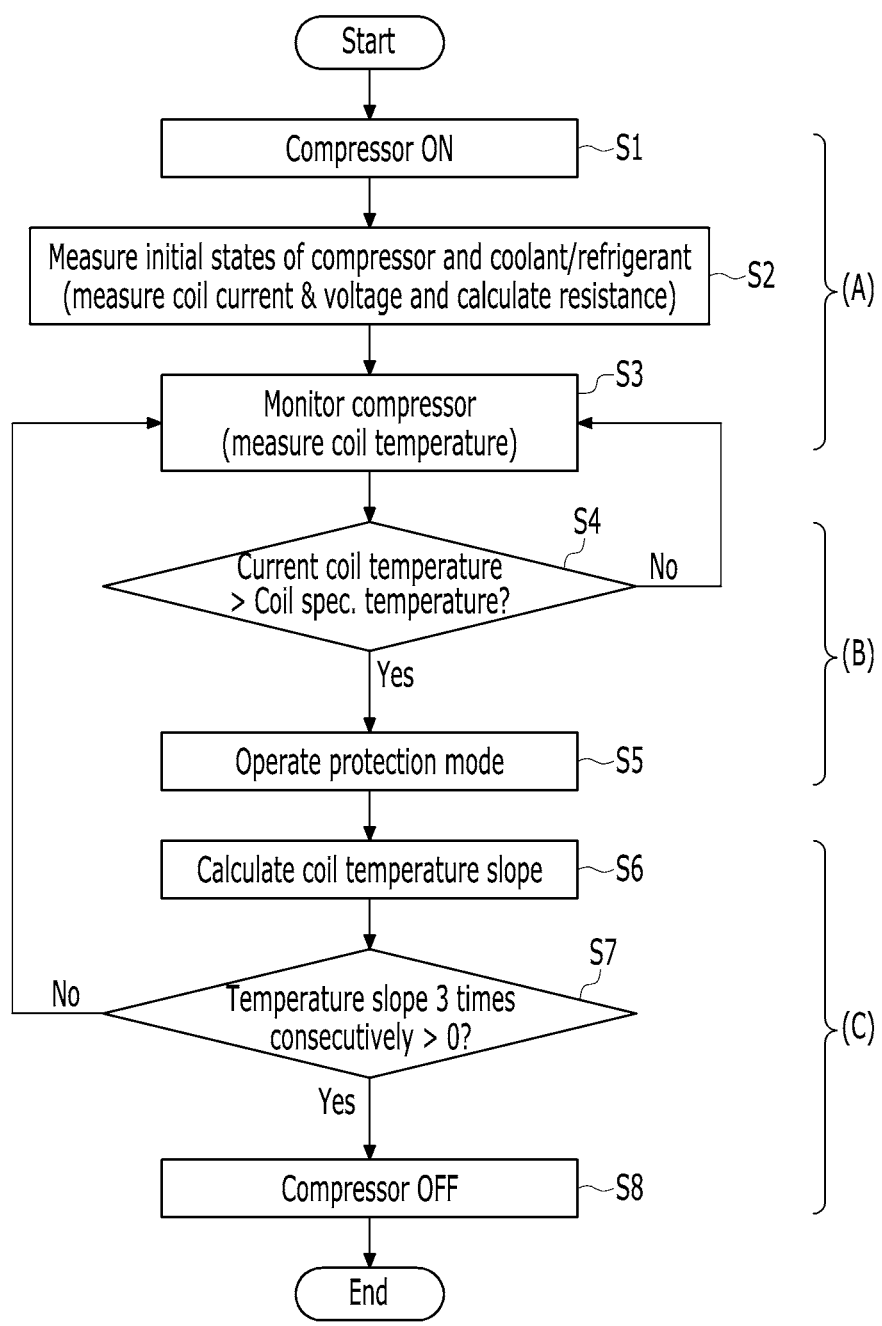
FIG. 3 is a control flowchart illustrating a heat pump system control method for a vehicle according to an exemplary embodiment of the present disclosure.

FIG. 2 is a block diagram illustrating a heat pump system control apparatus to which a heat pump system control method for a vehicle according to an exemplary embodiment of the present disclosure is applied, and FIG. 3 is a control flowchart illustrating a heat pump system control method for a vehicle according to an exemplary embodiment of the present disclosure.

Referring to the drawings, a heat pump system control method for a vehicle according to an exemplary embodiment of the present disclosure is controlled by a controller 100 and is applied to the electric vehicle to which the above-described heat pump system for the vehicle (refer to FIG. 1) is applied.

As shown in FIG. 2, the heat pump system may be controlled by a heat pump system control apparatus, and the heat pump system control apparatus may include the controller 100 and a data detector 110.

Here, the data detector 110 may detect data for preventing failure and break of the compressor 59 in advance by directly cooling the motor unit provided in the compressor 59 in the heat pump system.

The data detected by the data detector 110 is transmitted to the controller 100. The data detector 110 may include an air conditioning switch 113, a refrigerant temperature sensor 115, a current sensor 117, and a voltage sensor 119.

First, the air conditioning switch 113 may be operated by a user's manipulation, and may turn on or off operation of the air conditioner 50. Here, the controller 100 may determine whether or not the air conditioner 50 is operating according to the operation of the air conditioning switch 113.

The refrigerant temperature sensor 115 measures the temperature of the refrigerant and transmits a signal corresponding thereto to the controller 100.

The current sensor 117 may measure current supplied to the motor unit of the compressor 59 and transmit a signal corresponding thereto to the controller 100. Further, the voltage sensor 119 may measure voltage supplied to the motor unit of the compressor 59 and transmit a signal corresponding thereto to the controller 100.

The controller 100 may control the first expansion valve 57, the compressor 59, the second expansion valve 66, and the third expansion valve 68 to prevent failure and break of the compressor 59 by determining whether or not the compressor 59 is overheated based on the data detected by the data detector 110.

Here, a heat pump system control method for a vehicle according to an exemplary embodiment of the present disclosure prevents failure or break of the compressor 59 in advance by directly cooling the compressor 59 by controlling flow rate of the refrigerant or stopping the operation of the compressor 59 according to a temperature of the motor unit provided in the compressor 59 operated to cool or heat the vehicle interior of the electric vehicle.

To this end, as shown in FIG. 3, the heat pump system control method for the vehicle according to an exemplary embodiment of the present disclosure may include a process (A) of operating the compressor 59 to cool or heat the interior of the vehicle while the vehicle is driving, measuring by the controller 100 initial states of the compressor 59 and the refrigerant based on the data detected from the data detector 110, and monitoring the compressor 59; a process (B) of determining by the controller 100 whether a current coil temperature of the motor provided in the compressor 59 is higher than a coil specification temperature through the process (A) and operating a protection mode; and a process (C) of, when the process (B) is completed, calculating by the controller 100 a slope of a coil temperature over time, determining whether the temperature slope is greater than zero (0) three times consecutively to stop the operation of the compressor 59, and terminating control.

The process (A) may include the following steps.

First, when the air conditioning switch 110 is operated according to the user's request for cooling or heating of the interior of the vehicle while the vehicle is driving, the compressor 59 is driven to circulate the refrigerant in the air conditioner 50 at S1.

In this state, the controller 100 measures the current and voltage of the motor unit by an output signal output from the data detector 110, and measures an initial temperature of the refrigerant at S2.

Then, the controller 100 calculates a resistance of the motor unit using the current and voltage of the motor unit measured in the initial state measurement step S2, and measures and monitors the coil temperature of the motor unit at S3.

In the step S3 of measuring and monitoring the coil temperature of the motor unit, the coil temperature of the motor unit may be determined through the following equation:

$$T = \left(\frac{R - R_0}{R_0}\right) \times (K + T_0) + T_0$$

Here, where T is a temperature of a winding, $T_0$ is an initial temperature of the winding, R is a winding resistance at the temperature T, $R_0$ is the winding resistance at the temperature $T_0$, and K is a temperature coefficient of the winding.

The temperature of the motor unit provided in the compressor 59 may be measured by this equation.

When the process (A) as described above is completed, the controller 100 may perform the process (B).

In the process (B), the controller 100 determines whether the current coil temperature of the motor unit monitored through the process (A) is higher than the coil specification temperature at S4.

If it is determined that the current coil temperature of the motor unit is higher than the coil specification temperature (i.e., if a condition is satisfied), the controller 100 operates the protection mode at S5.

In the step S5 of operating the protection mode, the controller 100 may stop the operation of the first expansion valve 57 and increase flow rate of the refrigerant inflowing into the chiller 70 through the control of the second expansion valve 66 in the cooling mode of the vehicle or a cooling and battery cooling mode.

Here, the second expansion valve 66 may expand the refrigerant inflowing into the chiller 70.

Then, power consumption of the compressor 59 is reduced, and the low-temperature and low-pressure refrigerant passing through the chiller 70 inflows into the compressor 59 in the state in which its flow rate is increased.

Accordingly, the amount of heat generated by the compressor 59 may be lowered, and simultaneously, the refrigerant inflowing into the compressor 59 may directly cool the compressor 59 to more efficiently cool the compressor 59.

Conversely, in the step S5 of operating the protection mode, the controller 100 may control the third expansion valve 68 to increase flow rate of the refrigerant inflowing into the heat-exchanger 54 in the heating mode or the heating and dehumidifying mode of the vehicle.

Here, the third expansion valve 68 may expand the refrigerant supplied from the internal condenser 52a to supply it to the heat-exchanger 54, and the heat-exchanger 54 may evaporate the refrigerant using the coolants supplied from the first and second cooling apparatuses 10 and 20.

Simultaneously, the controller 100 may close the second bypass line 64 by operating the fourth valve V4 provided in the second bypass line 64.

Then, the power consumption of the compressor 59 is reduced, and the low-temperature and low-pressure refrigerant passing through the heat-exchanger 54 inflows into the compressor 59 in the state in which its flow rate is increased.

Accordingly, the amount of heat generated by the compressor 59 may be lowered, and simultaneously, the refrigerant inflowing into the compressor 59 may directly cool the compressor 59 to more efficiently cool the compressor 59.

On the other hand, in the step S4 of determining, by the controller 100, whether the current coil temperature of the motor unit is higher than the coil specification temperature, if it is determined that the current coil temperature of the motor unit is lower than the coil specification temperature (i.e., the condition is not satisfied), the controller 100 returns to the step S3 of monitoring the compressor 59, and the above-described steps may be repeated.

When the process (B) as described above is completed, the controller 100 may perform the process (C).

In the process (C), the controller 100 calculates the coil temperature slope of the motor unit over time at S6.

Then, the controller 100 determines whether the coil temperature slope calculated in the step S6 of calculating the coil temperature slope is greater than zero (0) three times consecutively at S7.

If it is determined that the coil temperature slope is greater than zero (0) three times consecutively (i.e., if the condition is satisfied) in the step S7 of determining whether the coil temperature slope is greater than zero (0) three times consecutively, the controller 100 may stop the operation of the compressor 59 at S8 and terminate the control.

In other words, when the coil temperature of the motor unit rises three times consecutively, the controller 100 may determine that the compressor 59 is not cooled through the step S5 of operating protection mode and stop the compressor 59, thereby preventing the motor unit of the compressor 59 from being damaged and burned due to overheating in advance.

Conversely, if it is determined that the coil temperature slope is not greater than zero (0) three times consecutively (i.e., the condition is not satisfied) in the step S7 of determining whether the coil temperature slope is greater than zero (0) three times consecutively, the controller 100 may return to the step S3 of monitoring the compressor 59.

After the controller 100 returns to the step S3 of monitoring the compressor 59, each of the above-described steps is repeatedly performed.

Therefore, if the heat pump system control method for the vehicle according to an exemplary embodiment of the present disclosure configured as described above is applied, it is possible to prevent failure and break of the compressor 59 in advance by directly cooling the compressor 59 by controlling the flow rate of the refrigerant or stopping the operation of the compressor 59 according to the temperature of the motor unit provided in the compressor 59 operated to cool or heat the vehicle interior of the electric vehicle.

Further, according to the present disclosure, it is possible to measure the temperature of the motor unit without adding a separate temperature sensor and thus prevent an increase in the manufacturing cost by calculating the coil temperature of the motor unit by the resistance method calculation using the current and voltage measurement.

Further, according to the present disclosure, it is possible to prevent damage and burning of the motor unit due to poor cooling in advance by increasing the flow rate of the refrigerant inflowing into the compressor 59 according to the temperature of the motor unit to directly cool the motor unit.

Furthermore, according to the present disclosure, it is possible to improve the durability and lifespan of the compressor 59 and reduce the maintenance costs.

As described above, although the present disclosure has been described with reference to limited exemplary embodiments and drawings, the present disclosure is not limited thereto, and various modifications and variations are, of course, possible within the technical spirit of the present disclosure and the range of equivalents of the claims to be described below by those skilled in the art to which the present disclosure pertains.

The invention claimed is:

1. A heat pump system control method for a vehicle, the method comprising:
   a process (A) of operating a compressor of an air conditioner to cool or heat an interior of the vehicle while the vehicle is driving, and measuring by a controller initial states of the compressor and a refrigerant based on data detected from a data detector, and monitoring the compressor;
   a process (B) of determining by the controller whether a current coil temperature of a motor unit provided in the compressor is higher than a coil specification temperature through the process (A) and operating a protection mode; and
   a process (C) of, when the process (B) is completed, calculating by the controller a slope of a coil temperature of the motor unit over time, determining whether the temperature slope is greater than zero (0) three times consecutively to stop the operation of the compressor, and terminating control.

2. The method of claim 1, wherein:
   the process (A) comprises:
   circulating the refrigerant in the air conditioner by driving the compressor according to a user's request for cooling or heating the interior of the vehicle;
   an initial state measurement step of, by the controller, measuring current and voltage of the motor unit and measuring an initial temperature of the refrigerant; and
   calculating, by the controller, a resistance of the motor unit using the current and voltage of the motor unit measured in the initial state measurement step and measuring and monitoring the coil temperature of the motor unit.

3. The method of claim 2, wherein:
   the process (B) comprises:
   determining, by the controller, whether the current coil temperature of the motor unit monitored through the process (A) is higher than the coil specification temperature; and
   operating the protection mode if it is determined that the current coil temperature of the motor unit is higher than the coil specification temperature.

4. The method of claim 3, wherein:
   in the determining whether the current coil temperature of the motor unit is higher than the coil specification temperature,
   if it is determined that the current coil temperature of the motor unit is lower than the coil specification temperature, then the controller returns to the step of monitoring the compressor.

5. The method of claim 3, wherein:
   in the operating the protection mode, when the vehicle is in a cooling mode or in a cooling and battery cooling mode, the controller stops operation of a first expansion valve and increases flow rate of the refrigerant inflowing into a chiller by control of a second expansion valve.

6. The method of claim 3, wherein:
   in the operating the protection mode, when the vehicle is in a heating mode or a heating and dehumidifying mode, the controller increases flow rate of the refrigerant inflowing into a heat-exchanger by control of a third expansion valve.

7. The method of claim 3, wherein:
   the process (C) comprises:
   calculating, by the controller, the coil temperature slope of the motor unit over time;
   determining, by the controller, whether the coil temperature slope calculated in the calculating the coil temperature slope is greater than zero (0) three times consecutively; and
   stopping the operation of the compressor and terminating the control if it is determined that the coil temperature slope is greater than zero (0) three times consecutively in the determining whether the coil temperature slope is greater than zero (0) three times consecutively.

8. The method of claim 7, wherein:
   if it is determined that the coil temperature slope is not greater than zero (0) three times consecutively in the determining whether the coil temperature slope is greater than zero (0) three times consecutively, the controller returns to the monitoring of the compressor.

9. The method of claim 2, wherein:
   in the monitoring, the coil temperature of the motor unit is determined by $$T = \left(\frac{R - R_0}{R_0}\right) \times (K + T_0) + T_0,$$

where T is a temperature of a winding, $T_0$ is an initial temperature of the winding, R is a winding resistance at the temperature, $R_0$ is the winding resistance at the temperature $T_0$, and K is a temperature coefficient of the winding.

10. The method of claim 1, wherein:

the data detector comprises:

an air conditioning switch configured to turn on and off operation of the air conditioner;

a refrigerant temperature sensor configured to measure a temperature of the refrigerant;

a current sensor configured to measure current of the motor unit; and a voltage sensor configured to measure voltage of the motor unit.

* * * * *